Dec. 5, 1967 P. J. ALLEN 3,357,021
POLARIZATION CHARACTERISTICS MEASURING SYSTEM
Filed May 31, 1966 2 Sheets-Sheet 1

INVENTOR
PHILIP J. ALLEN

BY *(signature)* AGENT
*(signature)* ATTORNEY

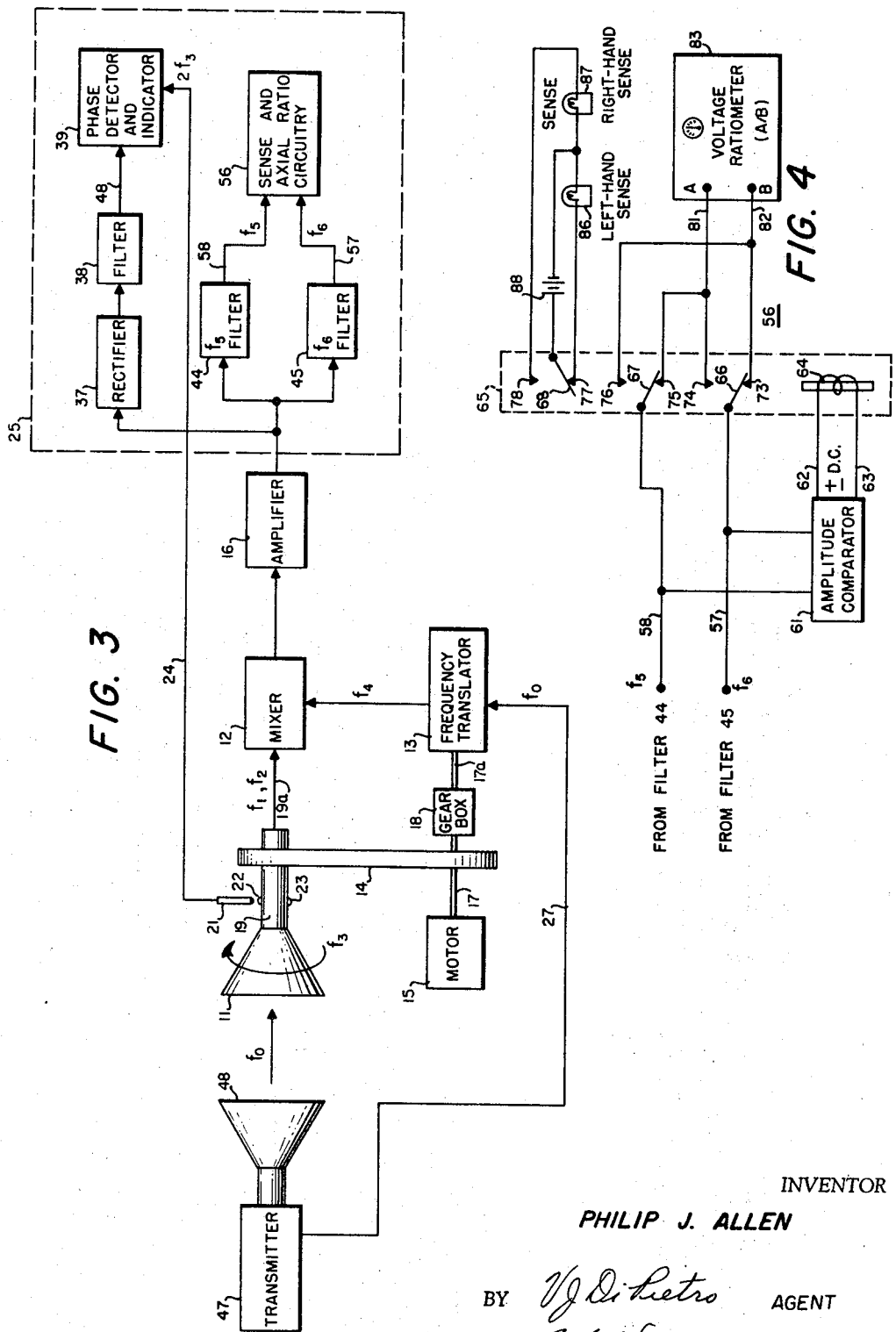

United States Patent Office 3,357,021
Patented Dec. 5, 1967

3,357,021
POLARIZATION CHARACTERISTICS
MEASURING SYSTEM
Philip J. Allen, 8000 Marion St.,
North Forestville, Md. 20028
Filed May 31, 1966, Ser. No. 553,972
10 Claims. (Cl. 343—100)

ABSTRACT OF THE DISCLOSURE

A system for analyzing the polarization characteristics of an electromagnetic wave including a polarimeter for extracting the orthogonal components from a received elliptically polarized wave and for measuring the axial ratio, sense of rotation and orientation angle by utilizing the relative magnitudes or absolute values of the extracted orthogonal components.

The invention described herein may be manufactured and used by or for the Government of the United States of America for governmental purposes without the payment of any royalties thereon or therefor.

This invention relates generally to a system for analyzing the polarization characteristics of an electromagnetic wave and more particularly to a polarimeter for extracting the orthogonal components from a received elliptically polarized wave and for measuring the axial ratio, sense of rotation and orientation angle by utilizing the relative magnitudes or absolute values of the extracted orthogonal components.

Any polarized electromagnetic wave propagating in free space can be resolved into two orthogonally polarized components. It is common practice to resolve a wave into its orthogonal linearly polarized components. However, the same wave can also be resolved into two orthogonal circularly polarized components, that is, two circularly polarized components of opposite sense.

An elliptically polarized wave is a wave in which the rotating electric field vector defines an ellipse in a plane perpendicular to the direction of propagation. In general, both linear and circular polarizations are special cases of elliptical polarization. The three parameters necessary to specify such a wave are the axial ratio, the sense of rotation and the orientation angle. Axial ratio refers to the ratio of the major to the minor axis of the ellipse. The sense of rotation refers to the direction of rotation of the electric vector in a reference plane perpendicular to the direction of propagation, being right-hand if the vector rotates clockwise as the wave recedes from an observer and left-hand if the vector rotates counterclockwise under the same conditions. The sense of rotation depends on the relative amplitude of the circularly polarized components with the larger component determining the sense of the wave. The orientation angle refers to the angle between the major axis of the ellipse and a chosen reference line in space.

In the past, one of the most effective methods for measuring axial ratio and orientation of a polarized wave has been with a rotatable linearly polarized antenna. Both of these parameters, that is, axial ratio and orientation, are readily determinable in a precise manner by utilizing the rotatable linearly polarized antenna but this method does not allow determination of the sense of the wave. By means of the present invention, which utilizes a continuously rotating linearly polarized antenna, axial ratio, orientation and sense of a wave are accurately and simultaneously determined.

When a linearly polarized antenna with signal input $f_0$ is rotated at $f_3$ about its axis of radiation, the radiated signal is spectrally split into three frequency components $f_0$, $f_A$ and $f_B$ such that $f_A = f_0 + f_3$ and $f_B = f_0 - f_3$. However along the axis of rotation, there is no component $f_0$ while $f_A$ and $f_B$ are present as circularly polarized components of the rotating linearly polarized wave which is radiated by the antenna.

Reception of an incoming polarized wave by means of such rotating linearly polarized antenna produces a similar spectral splitting of the signal at the terminals of the antenna. An incoming signal at frequency $f_0$ will be spectrally split into three components $f_0$, $f_1$ and $f_2$ such that $f_1 = f_0 + f_3$ and $f_2 = f_0 - f_3$ for an antenna rotating at frequency $f_3$. When the direction of signal arrival is along the axis of rotation which coincides with the axis of radiation of the antenna, the amplitude of $f_0$ is zero, and the two components $f_1$ and $f_2$ correspond to the circularly polarized components of the incoming signal. In effect, the circularly polarized components of the incoming polarized wave are resolved at the terminals of the antenna as components differing in frequency, and can be separated on this basis. These components, $f_1$ and $f_2$, are symmetrically displaced from the original signal frequency $f_0$ by plus and minus the antenna rotation frequency $f_3$.

When the incoming signal is linearly polarized, the two components $f_1$ and $f_2$ will be equal in amplitude since the circularly polarized components of a linearly polarized wave are equal. When the incoming wave is elliptically polarized the two components will have unequal amplitudes in the same ratio as the circularly polarized components of the wave. This can be expressed as a circular polarization ratio which is the ratio of the larger amplitude to the smaller amplitude. This amplitude information can also be utilized in determining the axial ratio of the wave which can be defined as the ratio of the sum of the circularly polarized components to the difference between the circularly polarized components, as follows:

$$\text{Axial ratio} = \frac{E_L + E_R}{E_L - E_R} \quad (1)$$

where $E_L$ and $E_R$ are respectively, the amplitudes of the left-hand and right-hand circularly polarized components. In essence, the maximum and minimum amplitudes induced in the rotating antenna are measured. However, the sense of the incident wave is also implicit in the output of the rotating antenna, since the direction of rotation of the antenna is utilized to distinguish the right-hand and the left-hand component of the incident wave. The components are shifted oppositely either up or down in frequency and can be separated by a heterodyning technique which causes each component to appear as a different intermediate frequency.

To attain the foregoing results, a fraction of the incoming signal which excites the receiving antenna is received by an auxiliary antenna and applied to a frequency translator for providing a "local oscillator" signal which is applied to a mixer which is also coupled to receive the signal from the rotating linearly polarized receiving antenna. Filtering in the mixer allows the intermediate difference frequency components to appear at its output. These difference components are amplified and coupled to signal processing circuitry which provides a signal indicative of the sense of the wave and a signal indicative of the axial ratio of the wave by comparing the amplitude of the frequency components. The sense will be indicated by the frequency component having the greater amplitude while axial ratio is derived from the circular polarization ratio which is the amplitude ratio of the two components. The output of the mixer is also coupled to a rectifier-filter circuit which extracts the envelope of the mixer signal. A phase detector circuit compares the phase of the envelope signal with a reference signal having the same fundamental frequency and which is derived from signal synchronized with the rotation of the linearly polarized receiving antenna. The phase angle between these two signals is a measure of the relative orientation of the major axis of the polarization ellipse of the incident wave. A feature of this invention is that the polarization measurement obtained is completely independent of carrier frequency.

It is accordingly an object of the present invention to provide an improved polarization measuring system which provides an accurate instantaneous indication of the polarization characteristics of an electromagnetic wave.

Another object of the present invention is to provide a polarization characteristics measurement system which presents an indication of the axial ratio, sense and orientation of an electromagnetic wave.

A further object of this invention is to provide a simple and inexpensive polarimeter which simultaneously indicates the axial ratio, sense, and orientation characteristics of an electromagnetic wave.

Still another object is to provide a polarization characteristics measurement system which presents an indication of the axial ratio, sense and orientation of an electromagnetic wave wherein the measurements are completely independent of the carrier frequency of the received wave.

Other objects and many of the attendant advantages of this invention will be readily appreciated as the same becomes better understood by reference to the following detailed description when considered in connection with the accompanying drawings in which like reference numerals designate like parts throughout the figures hereof and wherein:

FIG. 3 is another embodiment of the polarization characteristics measurement system of this invention; and FIG. 4 is a specific embodiment of the sense and axial ratio circuitry of FIG. 3.

Figure 1:
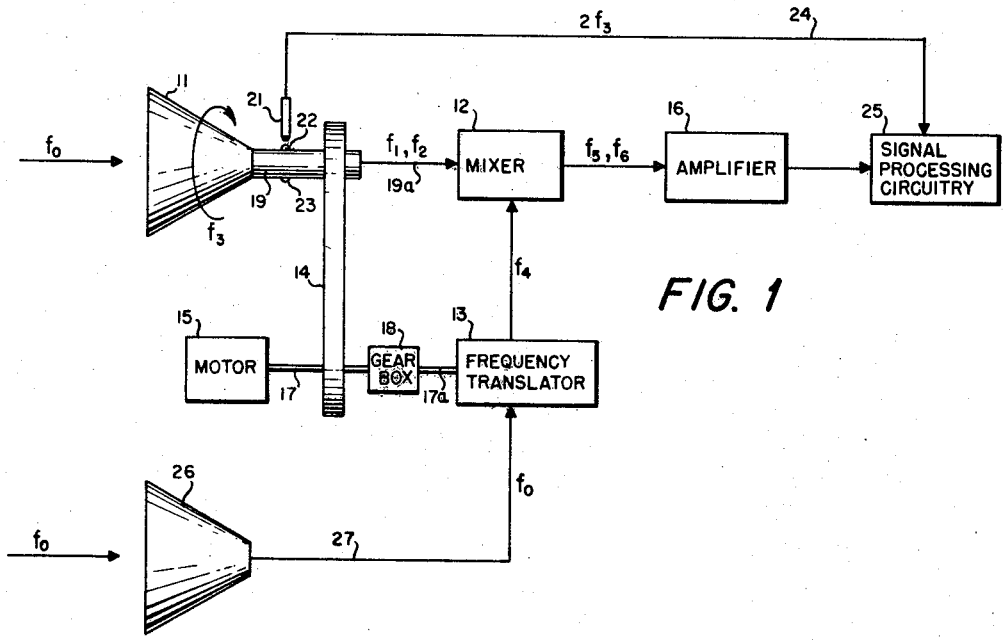
FIG. 1 is a diagrammatic representation of the polarization characteristics measurement system of this invention.

Referring now to the drawings, there is shown in FIG. 1 a basic system of this invention comprising a rotatable linearly polarized receiving antenna 11 for receiving a polarized wave wherein the antenna is designated as rotating at a frequency $f_3$. The sideband frequency at the output of antenna 11 are designated as $f_1$ and $f_2$ and are coupled to mixer 12 which also receives a local oscillator signal having a frequency $f_4$ from the output of frequency translator 13. Mechanical frequency translator 13 and antenna 11 are driven by motor 15. Antenna 11 is coupled to motor 15 by means of a timing belt 14. Motor 15 is coupled to frequency translator 13 by means of a shaft 17, gear box 18, and shaft 17a. Any suitable means other than timing belt 14 may be utilized for coupling motor 15 to antenna 11. Likewise, any suitable gearing may be used to couple shaft 17 to shaft 17a of frequency translator 13. Gear box 18 is reversible and has a variable gear ratio.

The output of mixer 12 provides two beat signals of intermediate frequencies $f_5$ and $f_6$ and is coupled to amplifier 16. Mixing is utilized here to beat the frequencies $f_1$ and $f_2$ to lower frequencies $f_5$ and $f_6$ so that the components can be separated by conventional filter techniques. The coherent heterodyning technique of this system preserves the frequency difference as well as the phase and amplitude relationship of the polarized components.

The frequency $f_0$ which is applied to frequency translator 13 is received from an auxiliary receiving antenna 26 and transmitted through line 27 to frequency translator 13. If antenna 26 is not capable of providing a signal of adequate power to the frequency translator, then it may be necessary to add an amplifier in line 27. As an alternative, the added amplifier could be added between the frequency translator 13 and mixer 12. It is to be noted that mixer 12 must operate as a linear converter and that the amplitude of the signal $f_4$ must be large as compared to the amplitudes of the signals $f_1$ and $f_2$ in order to preserve the relative amplitudes.

The signals $f_5$ and $f_6$ are amplified by amplifier 16 and are then applied to signal processing circuitry 25 which computes the axial ratio, sense and orientation of the incoming wave. A reference pickoff 21 is utilized to provide a reference signal $2f_3$ which is applied to the signal processing circuitry 25 through line 24. This reference signal is proportional to the rotation frequency $f_3$ of the rotating receiving antenna and is applied to the signal processing circuitry 25 which includes a computer for deriving axial ratio, sense and orientation. In the embodiment shown in FIG. 1, the magnetic pickoff 21 is utilized in conjunction with a pair of reference points 22 and 23 diametrically opposed about the waveguide section 17 so that a signal may be applied to signal processing circuitry 25 which is twice the rotation frequency $f_3$.

In the embodiment of FIG. 1, rotating receiving antenna 11 is coupled through a waveguide section 19 to a rotary joint (not visible). Line 19a is coupled between the rotary joint and mixer 12. By means of the rotary joint attached to shaft 19, timing belt 14 drives antenna 11 through waveguide 19. Line 19a does not rotate and couples the received signal from waveguide section 19 to mixer 12. Line 19a may be a waveguide section, coaxial cable, or any other suitable coupling means.

Figure 2:
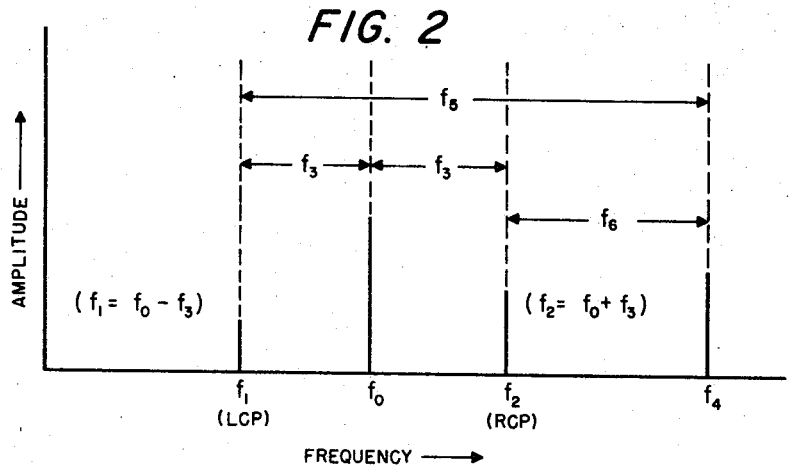
FIG. 2 is a frequency diagram of the various frequencies developed and utilized in the system.

FIG. 2 is a frequency diagram of the various signals developed throughout the system of FIG. 1 wherein $f_0$, the reference frequency, is shown as a center frequency. The frequency $f_1$ is a sideband related to the left-hand circularly polarized component of the incoming wave and is shown displaced by an amount equal to $f_3$ which is the antenna rotation frequency, while the frequency $f_2$ is a sideband related to the right-hand circularly polarized component and is likewise displaced from $f_0$ by an amount $f_3$. The frequency $f_4$, analogous to a local oscillator signal and applied to mixer 12 by frequency translator 13, is mixed with the frequencies $f_1$ and $f_2$ to yield the intermediate difference frequencies $f_5$ and $f_6$, respectively. The frequency $f_5$ is the difference between $f_4$ and $f_1$, while $f_6$ is the difference between $f_4$ and $f_2$. A reference signal of frequency $2f_3$ is applied to one input of signal processing circuitry 25 through line 24. The frequencies $f_5$ and $f_6$ differing by a frequency $2f_3$ are applied through amplifier 16 to the other input of circuitry 25. Any phase difference between the signals may therefore be indicated.

In the operation of the system of FIG. 1, if antenna 11 receives a polarized wave of frequency $f_0$ while it rotates at a frequency $f_3$, a pair of intermediate difference frequencies $f_5$ and $f_6$ which correspond to the sidebands $f_1$ and $f_2$ of the received signal are produced by mixer 12 when the frequencies $f_1$ and $f_2$ are mixed with frequency $f_4$. The intermediate frequencies $f_5$ and $f_6$ are coupled to signal processing circuitry 25 through amplifier 16. Circuitry 25 provides an indication of the sense of the wave by comparing the amplitude of the frequency components $f_1$ and $f_2$. The sense is given by the frequency component having the greater amplitude. Since the two frequency components $f_1$ and $f_2$ correspond to the circularly polarized components comprising the original wave, they have the same amplitude ratio. This amplitude ratio is utilized by circuitry 25 to determine the axial ratio of the received wave in accordance with Equation 1 set forth above. Circuitry 25 provides an indication of orientation by comparing the phase of the signal $2f_3$ received from pickoff 21 with the phase of the envelope of the signals $f_5$ and $f_6$ received from amplifier 16. The phase difference will be proportional to the orientation angle. As shown by the frequency diagram of FIG. 2, the two frequency components $f_1$ and $f_2$ are symmetrically displaced from the original signal frequency by + and − the rotation frequency. They have equal amplitudes whenever the incident wave is linearly polarized and have unequal amplitudes whenever the incident wave is other than linearly polarized.

FIG. 3 is another embodiment of the system of this invention wherein a transmitter 47 drives a test antenna 48 which transmits the signal $f_0$ to the rotating linearly polarized antenna 11. A reference frequency $f_0$ is derived from the transmitter 47 of the test antenna system and coupled to frequency translator 13 where it is translated into the frequency $f_4$. Hence the signal received by antenna 11 and the signal applied to frequency translator 13 are identical as in the system of FIG. 1. The system of FIG. 3 also shows a specific circuitry which may be used for the signal processing circuitry 25 of FIG. 1. A rectifier 37 is coupled to the amplifier 16 for detecting the intermediate frequency signals $f_5$ and $f_6$ and a filter 38 is coupled between the rectifier 37 and a first input of phase detector and indicator 39. In the specific embodiment of FIG. 3, a magnetic pickoff 21 is utilized in conjunction with the reference points 22 and 23 of wave guide portion 17 to provide a reference frequency $2f_3$ to a second input of phase detector and indicator 39. The indicator of element 39 provides a signal which is calibrated to give a direct indication of the orientation angle of the wave received by antenna 11. The output of amplifier 16 is also coupled to the input of filters 44 and 45 which separate the frequencies $f_5$ and $f_6$. Filter 44 provides the frequency $f_5$ at its output while filter 45 provides a frequency $f_6$ at its output. Both of the frequencies $f_5$ and $f_6$ are coupled to sense and axial ratio circuitry 56 shown schematically in FIG. 4 and more fully described hereinafter.

FIG. 4 is a schematic circuit diagram of the sense and axial ratio circuitry 56 comprising a conventional amplitude comparator 61 for comparing the amplitudes of the frequency components $f_5$ and $f_6$. Output leads 62 and 63 of amplitude comparator 61 are coupled to relay coil 64 of bistable polarized relay 65. Output lead 62 provides a D.C. signal of positive or negative polarity depending upon whether the amplitude of $f_5$ or $f_6$ is larger. Poles 66–68 are normally in one position and are activated in either the upward or downward direction depending upon the polarity of the D.C. signal of lead 62.

The signal $f_6$ is connected by means of line 57 to pole 66 and is applied to either contact 73 or contact 74 depending upon the comparator output signal. Similarly, the signal $f_5$ is coupled by line 58 to pole 67 and is applied to either contact 75 or 76 depending upon the comparator output polarity. Relay contacts 74 and 75 are connected to input 81 of frequency insensitive voltage ratiometer 83 while relay contacts 73 and 76 are connected to input 82 of ratiometer 83. By means of this switching arrangement the signal $f_5$ or $f_6$ having the larger amplitude is always applied to input A of ratiometer 83 while the smaller amplitude is applied to input B. While the actual ratio measured is the circular polarization ratio the meter of ratiometer 83 is calibrated to provide a direct indication of axial ratio.

Relay contacts 77 and 78 are connected to one terminal of each of the indicator lamps 86 and 87, respectively. The other terminal of each of lamps 86 and 87 is connected to a terminal of voltage source or battery 88 which has its other terminal connected to pole 68. Hence when relay coil 64 is energized, battery 88 is coupled across either lamp 86 or 87 depending upon the polarity of the signal at the output of comparator 61. Lamp 86 serves to indicate that the sense is left-hand circularly polarized while lamp 87 serves to indicate that the sense is right-hand circularly polarized.

Output line 62 of comparator 31 is positive and output line 63 is negative when the amplitude of frequency $f_6$ is greater than the amplitude of $f_5$ and relay coil 64 is energized to activate poles 66–68 in the upward direction to contacts 74, 76 and 78, respectively. When the amplitude of $f_5$ is greater than the amplitude of $f_6$ the polarities of lines 62 and 63 are reversed so that line 62 is negative and line 63 is positive thereby energizing relay coil 64 to activate poles 66–68 in the downward direction to contacts 73, 75 and 77, respectively. If the amplitudes of $f_5$ and $f_6$ are equal relay coil 64 is not energized and poles 66–68 remain in their normal position which may be either the downward or upward position as shown in FIG. 4. It is not necessary that relay coil 64 be energized when the amplitudes of $f_5$ and $f_6$ are equal since ratiometer 83 indicates unity regardless of the position of poles 76 and 77. When unity is indicated by meter 83, the sense indication is ignored since it is meaningless in the case of linear polarization.

It should be noted that the circuitry of FIG. 4 is given by way of illustration only and that other suitable circuitry may be utilized. For example, a polarized relay having neutral pole position can be employed so that poles are moved each time relay 65 is energized. In that case, no indication is provided when the amplitudes of $f_5$ and $f_6$ are equal. Consequently, an additional comparator is utilized having inputs for receiving $f_5$ and $f_6$ and providing an output signal only when $f_5$ and $f_6$ are equal in amplitude to energize an indicator.

In providing sense indications, where $f_2$ is proportional to the right-hand circularly polarized component and $f_1$ is proportional to the left-hand circularly polarized component, and $f_5$ corresponds to $f_1$ while $f_6$ corresponds to $f_2$, then $f_6$ is greater in amplitude than $f_5$ if the $f_2$ component of the received signal is larger in amplitude than the $f_1$ component. Consequently, lamp 87 of FIG. 4 is energized thereby indicating that the incoming wave is right-hand in sense. Similarly, where $f_5$ is greater in amplitude than $f_6$, lamp 86 indicates that the incoming wave is left-hand in sense.

In operation, if antenna 11 receives a polarized wave of frequency $f_0$ while it rotates at a frequency $f_3$, a pair of intermediate difference frequencies $f_5$ and $f_6$ which correspond to the sidebands $f_1$ and $f_2$ of the received signal are produced by mixer 12 when the frequencies $f_1$ and $f_2$ are mixed with frequency $f_4$. The intermediate frequencies $f_5$ and $f_6$ are coupled to a pair of filters 24 and 25 which separate $f_5$ and $f_6$. These difference components are coupled to sense an axial ratio circuitry 56. This circuitry provides a signal indicative of the sense of the wave by comparing the amplitude of the frequency components $f_1$ and $f_2$. The sense is given by the frequency component having the greater amplitude and is indicated by lamps 86 and 87. Since the two components correspond to the circularly polarized components comprising the original wave, they have the same amplitude ratio. This circular polarization ratio is utilized by the ratiometer in determining the axial ratio of the received wave. As shown by the frequency diagram of FIG. 3 the two frequency components $f_1$ and $f_2$ are symmetrically displaced from the original signal frequency by + and − the rotation frequency. They have equal amplitudes whenever the incident wave is linearly polarized and have unequal amplitudes when the incident wave is other than linearly polarized.

The output of amplifier 16, which comprises the frequencies $f_5$ and $f_6$, is also applied to rectifier 37 and filter 38 to extract the envelope $2f_3$ of the mixer signal. This envelope is applied to phase detector 39 together with the reference signal $2f_3$ of the same fundamental frequency and which is derived from the rotating frequency $f_3$ of antenna 11. The phase angle between the two signals applied to phase detector 39 is a measure of the relative orientation of the major axis of the polarization ellipse of the incident wave.

In certain applications, a convenient frequency relationship is obtained by driving frequency translator 13 at a frequency $f_3$ so that the local oscillator signal applied to mixer 12 is $2f_3$. The frequency $f_5$ is then equal to $f_3$, and $f_6$ is equal to $3f_3$.

The frequency at the output of frequency translator 13 is controlled by varying the rate at which frequency translator 13 is driven by motor 15. This rate is varied by changing the gear ratio of reversible and variable gear box 18.

Another convenient frequency relationship is obtained by having $f_4$ equal $f_2$. This can be accomplished by adjusting the gear ratio to drive frequency translator 13 at a frequency $f_3/2$ so that $f_6$ is zero and only $f_5$ is obtained at the output of mixer 12. By this technique, the component $f_1$ can be separated as an intermediate frequency $2f_3$. By simply reversing the direction of rotation of frequency translator 13 relative to receiving antenna 11, $f_4$ can be made equal to $f_1$ so that the $f_2$ component can be separated. It is seen that independent measurements can thereby be made on each circularly polarized component of the received polarized wave by simply varying the frequency relationships.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for measuring the axial ratio, orientation and sense of a polarized wave comprising:
   a rotatable linearly polarized antenna for receiving said polarized wave,
   means operatively coupled to said antenna for rotating said antenna, and
   means operatively coupled to said antenna for measuring and indicating axial ratio, orientation and sense of said polarized wave.

2. The system of claim 1 wherein the means operatively coupled to said antenna for measuring and indicating axial ratio, orientation and sense of said polarized wave comprises:
   heterodyning means for providing first and second signals proportional in amplitude to and having the same relative phase as the polarization components of said received wave,
   first and second filters coupled to said heterodyning means for separating said first and second signals, respectviely,
   comparator means coupled to said filter means for comparing the amplitude of said first and second signals to provide a signal indicative of the relative amplitude of said first and second signals,
   circuit means coupled to said comparator means for receiving said first and second signals and for providing an indication of the axial ratio and sense of said received polarized wave, and
   a phase detector coupled to said heterodyning means for providing a signal proportional to the relative phase angle between one of the components of the received wave and an arbitrary reference, said phase detector signal being proportional to the relative orientation of the major axis of the polarization ellipse of the incident wave.

3. The system of claim 2 wherein said phase detector has first and second inputs, and wherein the system further includes:
   an amplifier coupled between said heterodyning means and said first and second filters,
   a rectifier and third filter serially connected between said amplifier and said first phase detector input, and
   means coupled between said receiving antenna and said second phase detector input for providing a reference signal.

4. The system of claim 2 wherein said circuit means comprises:
   a relay coupled to said comparator means, and having first, second and third poles, wherein said first pole is coupled to said first filter, said second pole is coupled to said second filter and said third pole is coupled to receive a voltage, said relay having a pair of contacts associated with each of said poles wherein each of said poles is applied to one or the other of its respective contacts depending upon the state of energization of said relay,
   means coupled to the contacts associated with said first and second poles for providing an indication of axial ratio, and
   first and second sense indicating lamps each coupled between said third pole and one of the contacts assoicated with said third pole.

5. The system of claim 4 wherein said means for indicating axial ratio comprises a voltage ratiometer.

6. A system for receiving a polarized wave of frequency $f_0$ comprising:
   a rotatable linearly polarized antenna for receiving said polarized wave while rotating at a frequency $f_3$,
   frequency translating means for receiving a portion of said polarized wave of frequency $f_0$ and for translating it to a signal of frequency $f_4$,
   a mixer for receiving sideband signals $f_1$ and $f_2$ which are proportional in amplitude and phase to the polarization components of said received wave and wherein the signals $f_1$ and $f_2$ are each shifted an amount $f_3$ from the carrier frequency $f_0$, said $f_1$ and $f_2$ signals being mixed with said $f_4$ signals to derive beat frequencies $f_5$ and $f_6$ which are proportional in amplitude and phase to the $f_1$ and $f_2$ signals, respectively,
   an amplifier coupled to said mixer for amplifying $f_5$ and $f_6$, and
   filter means for separating $f_5$ and $f_6$.

7. A system as set forth in claim 6 further including:
   amplitude sensitive circuitry coupled to said filter means for comparing the amplitude of the $f_5$ and $f_6$ components to provide an indication of sense and for providing an indication of the axial ratio of the received wave,
   means for extracting the envelope of the signal produced at the output of said amplifier, and for producing a signal of frequency $2f_3$,
   means coupled to said receiving antenna for developing a reference signal of frequency $2f_3$, and
   a phase detector having first and second inputs and an output wherein said first input is coupled to the said means for extracting and said second input is coupled to said means for developing a reference signal and wherein said output provides a signal proportional to the relative phase angle between the phase detector inputs and proportional to the relative orientation of the major axis of the polarization ellipse of the incident wave.

8. A system as set forth in claim 7, wherein:
$f_4 = f_0 + 2f_3$, $f_6 = f_3$, and $f_5 = 3f_3$.

9. A system as set forth in claim 7, wherein:
$f_4 = f_2$ so that $f_6 = 0$ and $f_5$ is separated as $2f_3$.

10. A system as set forth in claim 7, wherein:
$f_4 = f_1$ so that $f_5 = 0$ and $f_6$ is separated as $2f_3$.

References Cited

UNITED STATES PATENTS

| | | | |
|---|---|---|---|
| 3,215,957 | 11/1965 | Dantzig, et al. | 343—100 |
| 3,230,532 | 1/1966 | Whitney | 343—100 |
| 3,246,331 | 4/1966 | Royal | 343—100 |
| 3,268,894 | 8/1966 | Lewis et al. | 343—100 |

OTHER REFERENCES

Ferris, Joseph E.: Study of Polarization Modulation Techniques, Melpar, Inc., pp. 9–17.

RICHARD A. FARLEY, *Primary Examiner.*

RODNEY D. BENNETT, *Examiner.*

H. C. WAMSLEY, *Assistant Examiner.*